United States Patent
Su et al.

(10) Patent No.: US 9,140,897 B2
(45) Date of Patent: Sep. 22, 2015

(54) OPTICAL SYSTEM, OPTICAL MODULE AND METHOD OF MANUFACTURE THEREOF

(75) Inventors: Guo-Dung Su, Taipei (TW); Hsin-Ta Hsieh, Taipei (TW)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 1140 days.

(21) Appl. No.: 13/104,214

(22) Filed: May 10, 2011

(65) Prior Publication Data
US 2012/0287519 A1 Nov. 15, 2012

(51) Int. Cl.
*G02B 5/10* (2006.01)
*G02B 7/185* (2006.01)
*G02B 26/08* (2006.01)
*G02B 7/188* (2006.01)

(52) U.S. Cl.
CPC .............. *G02B 26/0825* (2013.01); *G02B 5/10* (2013.01); *G02B 7/185* (2013.01); *G02B 7/188* (2013.01); *G02B 26/0841* (2013.01); *Y10T 29/49124* (2015.01)

(58) Field of Classification Search
CPC ............ G02B 5/08; G02B 5/10; G02B 7/185; G02B 7/188; G02B 26/0825; G02B 26/0841
USPC .............. 359/224.1, 291, 295, 846, 847, 869, 359/883, 900; 250/216
See application file for complete search history.

(56) References Cited

U.S. PATENT DOCUMENTS

| | | | | |
|---|---|---|---|---|
| 5,526,172 A | * | 6/1996 | Kanack | 359/291 |
| 6,147,789 A | * | 11/2000 | Gelbart | 359/231 |
| 6,343,178 B1 | * | 1/2002 | Burns et al. | 385/140 |
| 6,930,816 B2 | * | 8/2005 | Mochizuki | 359/291 |
| 7,123,397 B2 | * | 10/2006 | Murakami | 359/224.1 |
| 7,679,811 B2 | * | 3/2010 | Chiu | 359/291 |
| 2005/0057826 A1 | * | 3/2005 | Mizuyama et al. | 359/846 |
| 2006/0012851 A1 | * | 1/2006 | Wu et al. | 359/291 |
| 2006/0114585 A1 | * | 6/2006 | Ho | 359/846 |
| 2008/0037103 A1 | * | 2/2008 | Papavasiliou et al. | 359/291 |

OTHER PUBLICATIONS

Hsin-Ta Hsieh, Hsiang-Chun Wei, Meng-Hsuan Lin, Wei-Yao Hsu, Yuan-Chieh Cheng, and Guo-Dung John Su, "Thin autofocus camera module by a large-stroke micromachined deformable mirror", May 24, 2010/ vol. 18, No. 11 / Optics Express 11097.

* cited by examiner

*Primary Examiner* — Ricky D Shafer
(74) *Attorney, Agent, or Firm* — Bacon & Thomas, PLLC (57) ABSTRACT

An optical system, an optical module and a method of manufacture thereof are provided. The optical module includes a top membrane and a bottom electrode. The top membrane includes a supporting layer, a first metal layer and an isolating layer with an opening. The first metal layer is disposed on lower surface of the supporting layer. The isolating layer is disposed on lower surface of the first metal layer. The bottom electrode, disposed below the top membrane, includes a second metal layer and a plurality of pillars. The pillars are disposed on upper surface of the second metal layer and below the isolating layer, wherein some of the pillars support the isolating layer. Wherein the pillars are used for preventing the top membrane from being pulled down to touch the second metal layer through the opening when a voltage is applied between the first and the second metal layers.

21 Claims, 13 Drawing Sheets

OPTICAL SYSTEM, OPTICAL MODULE AND METHOD OF MANUFACTURE THEREOF

BACKGROUND

1. Field of the Invention

The present invention relates to an optical system, an optical module, and a method of manufacture thereof.

2. Background of the Invention

Conventional autofocus or zoom systems of Optical system require a set of lenses and large space because of mechanical motors. Recently, a MEMS-based motion control stage is used to minimize the space of mechanical motors. However, manipulation of the space between lenses is not the only way to change the effective optical power. It also could be done by either varying the surface curvature or changing the refractive index distribution. These methods can be generally divided into refractive type and reflective type. Liquid lens and liquid crystal lens (LC lens) belong to refractive type. Liquid lens adopts bi-liquid lenses that can deform the shape of the interface between two immiscible liquids by electro-wetting method. Liquid crystals (LCs) are excellent electro-optic materials with electrical and optical anisotropies. The optical properties can be controlled easily by external electric field. According to the change of refractive indices, the light can be converged and diverged. However, both liquid lens and liquid crystal lens need to utilize refractive design forms that require straight optical path. This fundamentally limits packaging thickness.

Another solution is reflective type, which adopts MEMS deformable mirrors (MEMS DM) to vary the optical power by deforming reflecting surfaces. The advantage of reflective type is chromatic aberration free. Besides, the straight optical path can be folded to reduce packaging thickness. DMs could be embedded with wave front sensors to correct the wavefront aberration for astronomical observation. The system is commercialized for years. Traditionally, MEMS DMs are made by inorganic materials, such as silicon or silicon nitride. These materials have high mechanical stiffness, which limits their deformation range. The deformation of MEMS DM presented in this paper is about one order of magnitude higher than commercial products. In this paper we propose an optical system using a polymer MEMS DM in a reflective design form. The polymer MEMS DM could achieve 12-μm displacement over a 3-mm aperture that corresponds to about 20 diopter focusing power. The optical layout design is 5.4 mm thick and 6.7 mm after packaging. The optical system design, performance analysis, experimental results are discussed in following sections.

SUMMARY

The invention is directed to an optical system, optical module and method of manufacture thereof. A plurality of pillars are disposed on upper surface of the second metal layer of the bottom electrode to prevent the top membrane from being pulled down to touch the second metal layer through the opening of the top membrane when a voltage is applied between the first and the second metal layers.

According to a first aspect of the present disclosure, an optical module is provided. The optical module includes a top membrane and a bottom electrode. The top membrane includes a supporting layer, a first metal layer and an isolating layer with an opening. The first metal layer is disposed on lower surface of the supporting layer. The isolating layer is disposed on lower surface of the first metal layer. The bottom electrode, disposed below the top membrane, includes a second metal layer and a plurality of pillars. The pillars are disposed on upper surface of the second metal layer and below the isolating layer, wherein some of the pillars support the isolating layer. Wherein the pillars are used for preventing the top membrane from being pulled down to touch the second metal layer through the opening when a voltage is applied between the first and the second metal layers.

According to a second aspect of the present disclosure, a method of manufacturing an optical module is provided. The method comprising the following steps. Forming a top membrane, this comprises: forming a supporting layer; forming a first metal layer on upper surface of the supporting layer; and forming an isolating layer with an opening on upper surface of the first metal layer. Forming a bottom electrode, which comprises: forming a second metal layer; and forming a plurality of pillars on upper surface of the second metal layer. And bonding the top and the bottom electrodes together such that the pillars are disposed between the second metal layer and the isolating layer, and some of the pillars support the isolating layer, wherein the pillars are used for preventing the top membrane from being pulled down to touch the second metal layer through the opening of the isolating layer when a voltage is applied between the first and the second metal layers.

These and other features, aspects and embodiments are described below in the section entitled "Description of the preferred embodiment."

DESCRIPTION OF THE PREFERRED EMBODIMENT

Figure 1A:
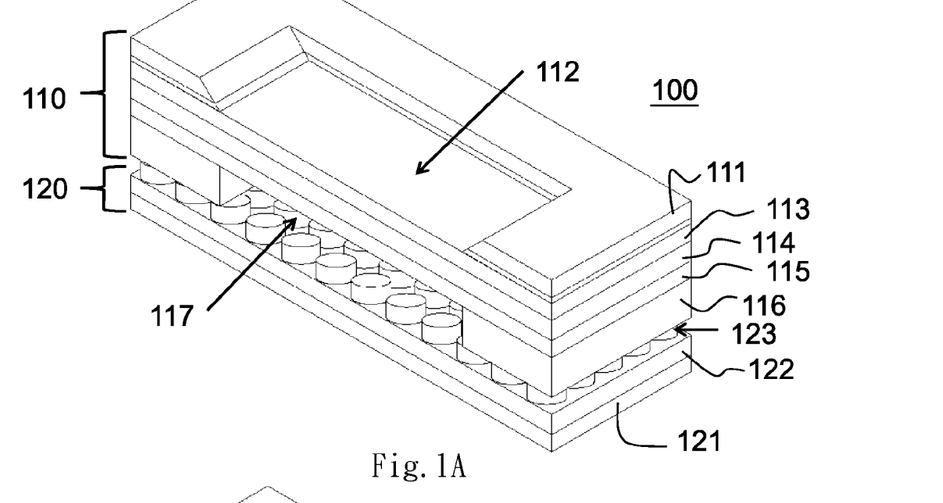
FIG. 1A shows the optical module with applied voltage.
Figure 1B:
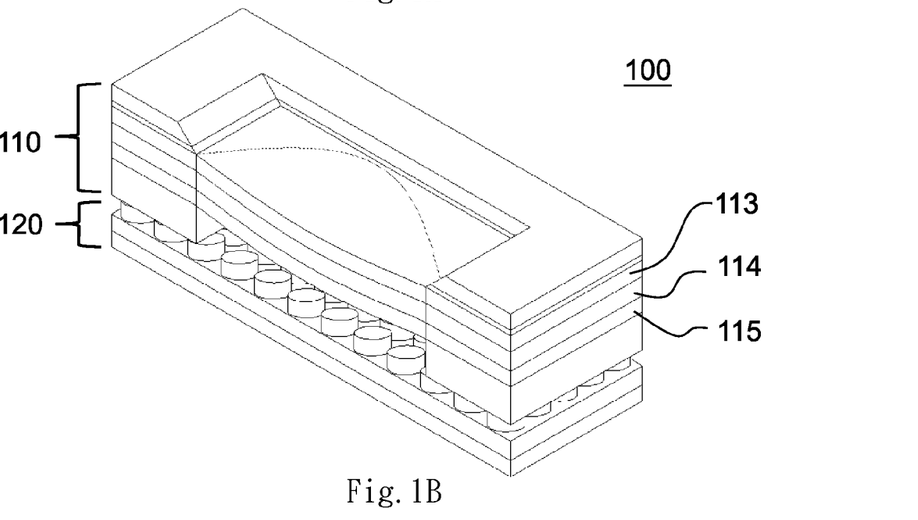
FIG. 1B shows the optical module without applied voltage.

Referring to FIGS. 1A-1B, which shows the optical module 100 with and without applied voltage. Wherein the optical module 100, such as the Deformable Mirror (DM), includes a top membrane 110 and bottom electrode 120.

The top membrane 110 includes a silicon wafer 111 with a tilt opening 112, a third metal layer 113, a supporting layer 114, a first metal layer 115, and a isolating layer 116 with an opening 117.

The bottom electrode 120 includes a bottom silicon wafer 121, a second metal layer 122 and a plurality of pillars 123.

Wherein the top membrane 110 is supported by the bottom electrode 120, that is, the bottom electrode 120 is disposed below the top membrane 110.

The first metal layer 115 is disposed on lower surface of the supporting layer 114. The isolating layer 116 with an opening 117 is disposed on lower surface of the first metal layer 115. The third metal layer 113 is symmetrically relative to the first metal layer 115 disposed on upper surface of the supporting layer 114 such that the residual stress of the first and the third metal layers 115 and 113 are balanced out by the symmetric configuration of the first and the third metal layers 115 and 113. The silicon wafer 111 with a tilt opening 112 is disposed on upper surface of the third metal layer 113, and the tilt opening 112 is located above the opening 117. Wherein the shape of the tilt opening 112 could be rectangle or square, and the supporting layer 114 could be constitute of polymer or polyimide.

The pillars 123 are disposed on upper surface of the second metal layer 122 and below the isolating layer 116, wherein the pillars are patterned to form air channels and some of the pillars 123 support the isolating layer 116. Wherein the pillars 123 are used for preventing the top membrane 110 from being pulled down to touch the second metal layer 122 through the opening 117 when a voltage is applied between the first and the second metal layers 115 and 122.

In addition, the first, the second and the third metal layer 115, 122 and 113 could be constitute of aluminum, and the shape of the opening 117 could be rectangle such that the shape of the area of the top membrane 110 pulled down through the opening 117 is elliptical when voltage is applied.

For example, refer to FIG. 1B, the voltage is applied and the pillars 123 prevent the first metal layer 115 from being pulled down to touch the second metal layer 122 through the opening 117, and the area of the top membrane 110 pulled down through the opening 117 is elliptical.

In addition, when a voltage is applied between the first and the second metal layers 115 and 113, the third metal layer 113 is pulled down like the first metal layer 115 such that upper surface of the third metal layer 113 has the function of curved mirror. For example, the upper surface of the third metal layer 113 shown as in FIG. 1B has the function of concave mirror.

Figure 2A:
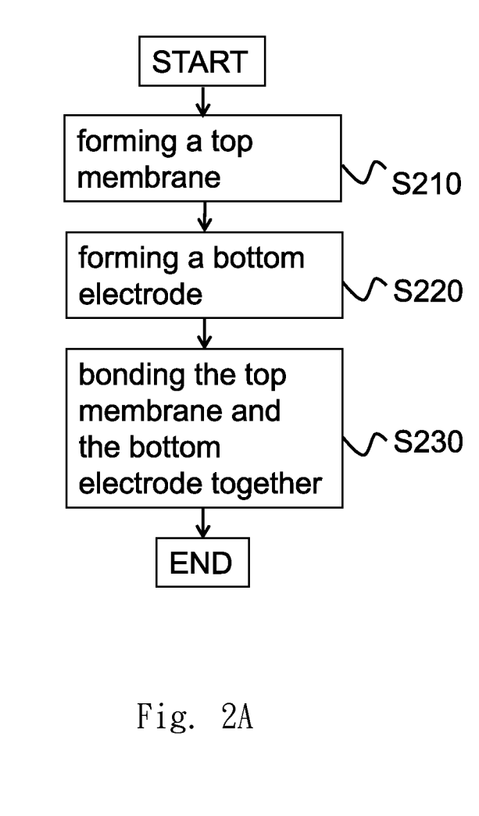
FIGS. 2A-2C shows the procedure of manufacturing an optical module.
Figure 2B:
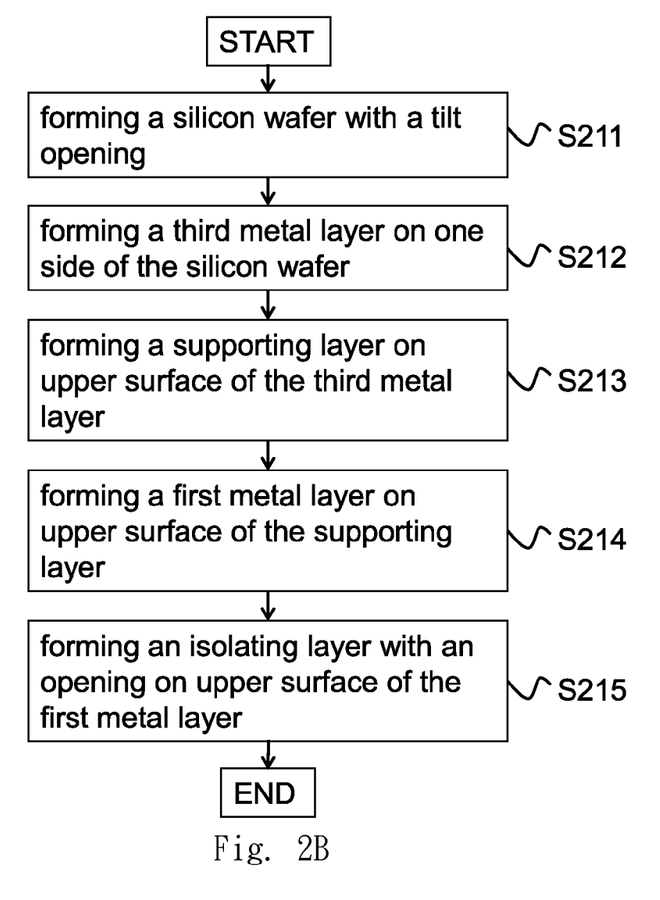
Figure 2C:
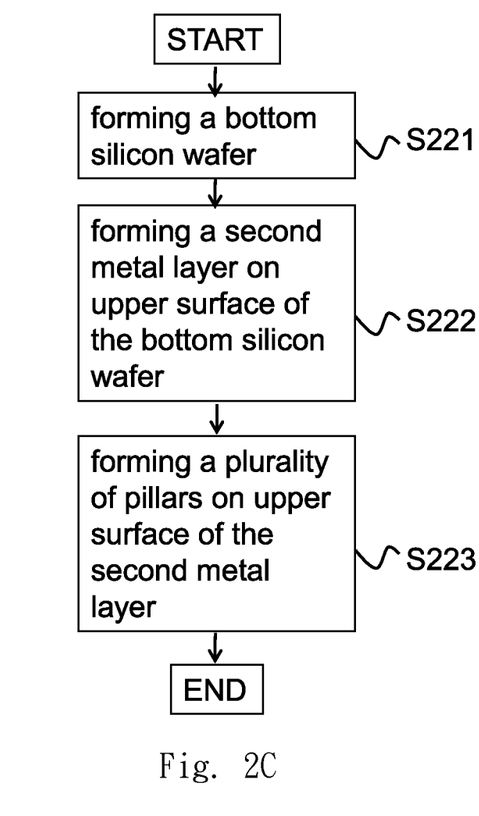
Figure 3A:
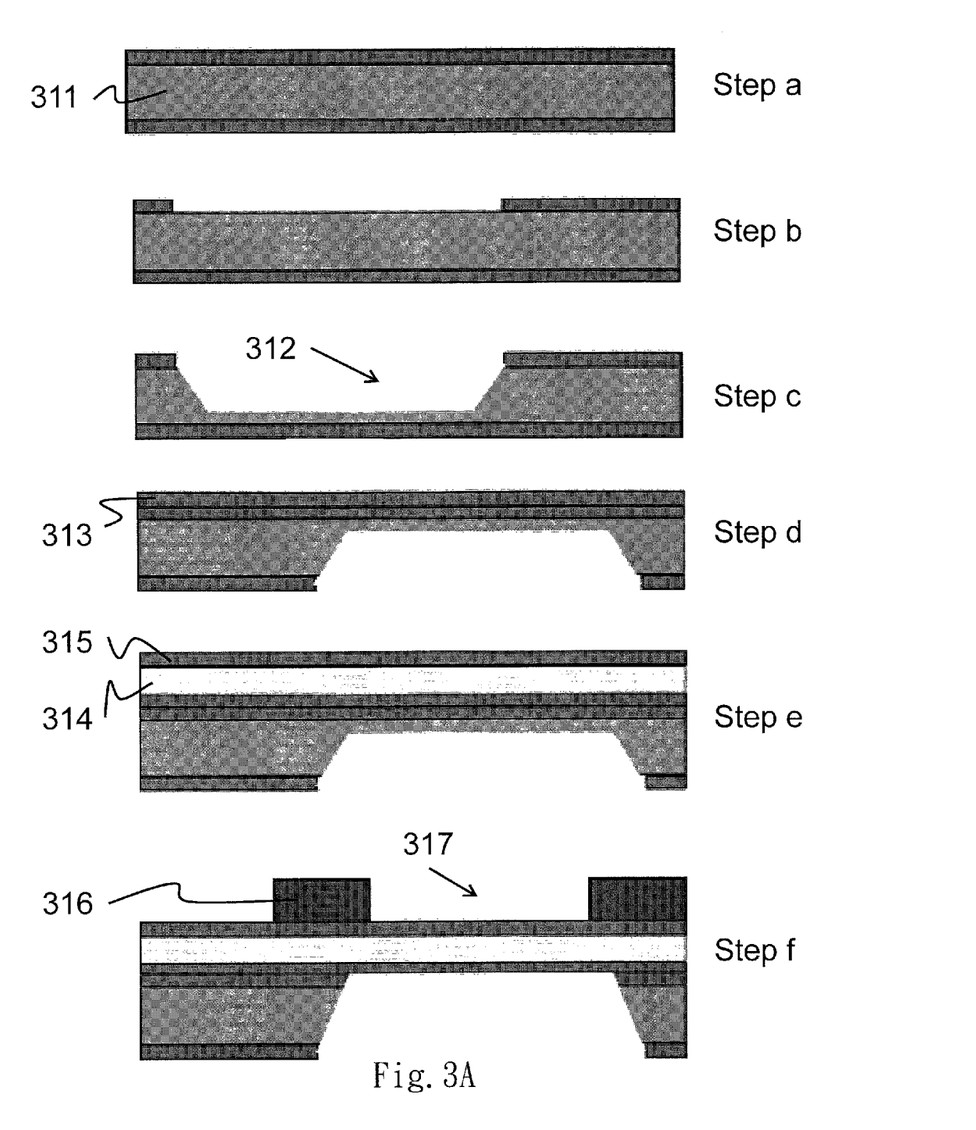
FIGS. 3A-3C shows the fabrication process for a top membrane, a bottom electrode, and an optical module.
Figure 3B:
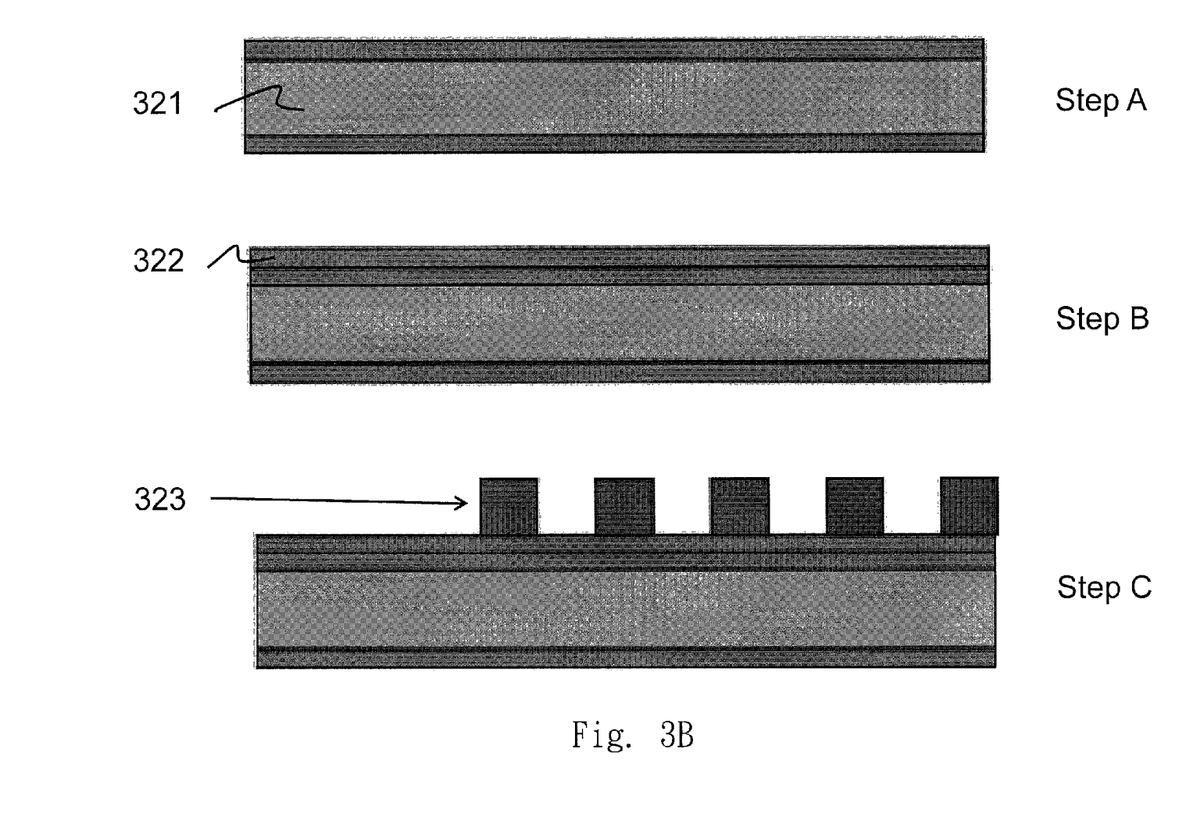
Figure 3C:
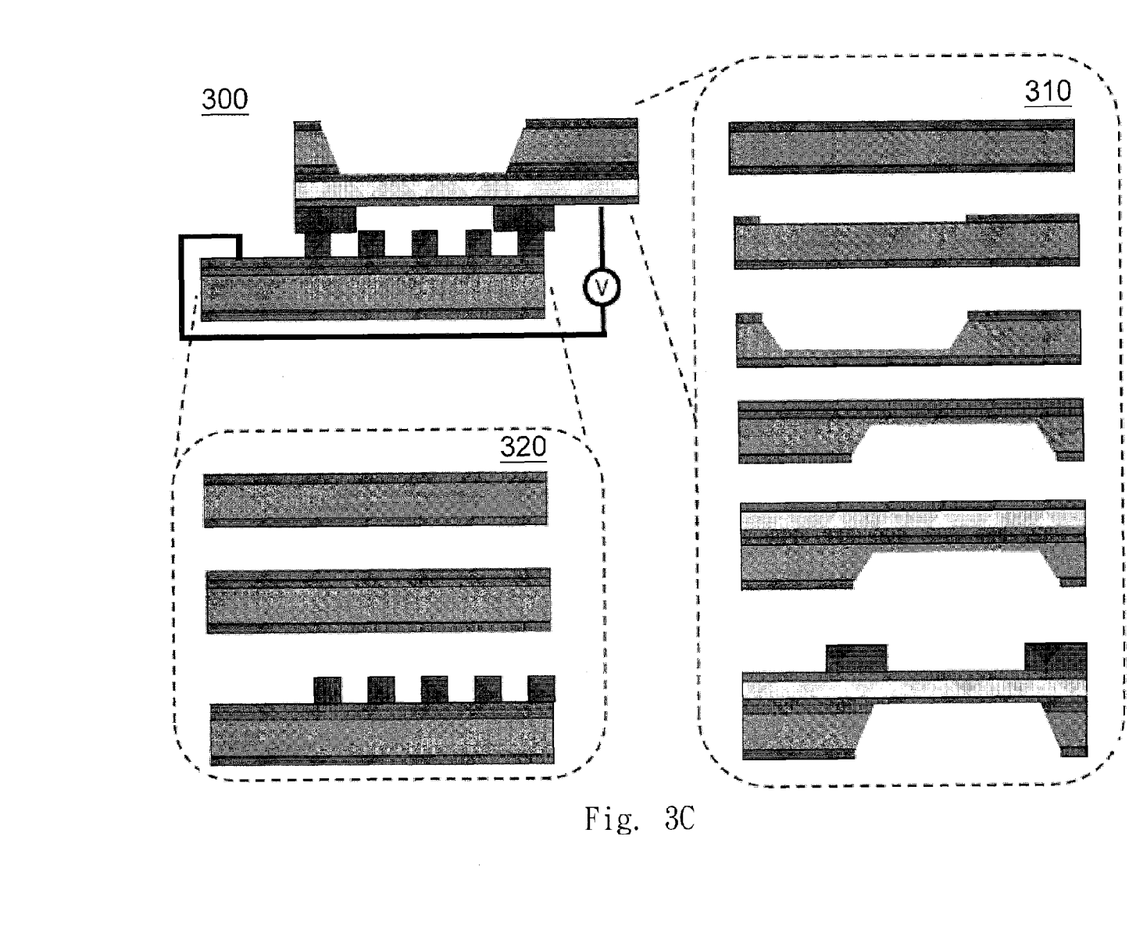

Referring to FIGS. 2A-2C and 3A-3C, FIG. 2A-2C shows the procedure of manufacturing an optical module 300, FIG. 3A-3C shows the fabrication process for a top membrane 310, a bottom electrode 320, and a optical module 300.

Refer to FIG. 2A, in step S210, forming a top membrane 310. Please refer to the FIG. 2B, which discloses the detail procedure of manufacturing the top membrane 310. In step S211, forming a silicon wafer 311 with a tilt opening 312. For example, in step a of FIG. 3A, the silicon wafer 311 is double side polished. A 6000 Å thermal oxide was grown for masking layer in wet etching process, and then an opening window was patterned on one side of the oxide. The non-PR (Photo Resist) covered region of oxide was etched by BHF and remove PR after etching finished, as shown in step b. Then the silicon wafer 311 could be dipped into a 90° C. TMAH (Tetramethyl ammonium hydroxide) solution for about 8 hours wet etching tank and this resulted in a tilt opening 512, such as 25 μm residual silicon layer, shown in step c.

In step S212, forming a third metal layer 313 on one side of the silicon wafer 311. For example, the third metal layer 313, such as Al/Cr (1200 Å/200 Å) layer, was evaporate on the flatten side such that the third metal layer 313 will become reflection layer, such as step d. If the third metal layer 313 is chromium layer, it can solve the adhesion problem.

In step S213, forming a supporting layer 314 on upper surface of the third metal layer 313. For example, the polyimide PI-2610 was spun at 4000 rpm for 60 seconds and was cured at 300° C. for 30 minutes in furnace to form the supporting layer 314, such as polymer layer, on the third metal layer 313, such as aluminum.

In step S214, forming a first metal layer 315 on upper surface of the supporting layer 314. For example, the first metal layer 315, such as another Al (1200 Å) layer, could be evaporated for electrode, and this formed a sandwich structure with the supporting layer 314 and the third metal layer 313, such as step e. Wherein the supporting layer 314, such as polyimide, was chosen due to similar coefficient of thermal expansion to silicon wafer 311 results in low thermal strain and low residual stress. The sandwich configuration balances the residual stress on double side of polymer layer.

In addition, the supporting layer 314 is sandwiched with the first and the third metal layer 315 and 313 so that the residual stress of metal layers are balanced out by the symmetric configuration. Furthermore, the supporting layer 314 is all covered with metal layers, preventing the supporting layer 314 from in contact with oxygen and moisture in air. It would increases the top membrane 310 reliability compared with only one side aluminum coating.

In step S215, forming an isolating layer 316 with an opening 317 on upper surface of the first metal layer 315. Wherein the isolating layer 316 could be a PR (Photo Resist) layer; and the opening 317 could be an elliptical, a square, or a rectangular opening. That is, when a voltage is applied, the top membrane 310 is pulled down by electrostatic force and the third metal layer 313 forms a curved surface to focus light.

For example, a PR layer was spun and an opening 317 was defined on upper surface of the first metal layer 315 to form an elliptical outside frame of a DM, as shown in step f. In present invention, the tilt opening 312 could be a 3.5 mm square and the opening 317 could be a 3 mm ellipse. The thickness of the opening 317 could be 20 μm and used to define deflection shape of the top membrane 310.

Finally, the residual Si layer was removed by XeF2 and etched the oxide and Cr layer on the first metal layer 315. The remaining oxide on the top membrane 310 was then removed by pad Etchant S, which minimizes damage to metal layers unlike traditional buffered hydrogen fluoride (HF).

Back to FIG. 2A, in step S220, forms a bottom electrode 320. Please refer to the FIG. 2C, which discloses the detail procedure of manufacturing the bottom electrode 320. In step S221, forming a bottom silicon wafer 321, as shown in step A of FIG. 3B.

In step S222, forming a second metal layer 322 on upper surface of the bottom silicon wafer 321. For example, the second metal layer 322, such as conducting Al/Cr, was evaporated on a flattern wafer 321 with an isolation oxide layer, as shown in step B.

In step S223, forming a plurality of pillars 323 on upper surface of the second metal layer 322. For example, the pillars 323 could be patterned to form air channels and short circuit protection stoppers, which prevent the third metal layer 315 from damage at snap down voltage. These air channels are important to improve the response time of the top membrane 310 because a sealed cavity underneath the top membrane 310 will slow down the moving speed of a top membrane 310 due to air damping effect. The pillars 323 allow the air to flow out the gap without damping the motion of the top membrane 310. Besides, the pillars 323 also prevent short circuit damages when the top membrane 310 is in touch with the bottom electrode 620.

For example, the thickness of the pillars 323 could be 12 μm so that the total gap between the top membrane 310 and the bottom electrode 320 is 32 μm. This provides enough spacing for the top membrane 310 to deform to 20 diopter before snapping down caused by electrostatic force.

Back to FIG. 2A, in step S230, bonds the top membrane 310 and the bottom electrode 320 together, as shown in FIG. 3C. For example, the top membrane 310 and the bottom electrode 320 could be bonded together by 100 N force at 120° C. for 60 minutes. In order to connect the wires from the back side of top membrane 310, two small cavities were opened in step c. Two conducting wires were attached on a top membrane 310 by conductive epoxy. Due to the tensile residual stress of the top membrane 310, the reflecting surface, such as the third metal layer 313, is very flat.

Figure 4:
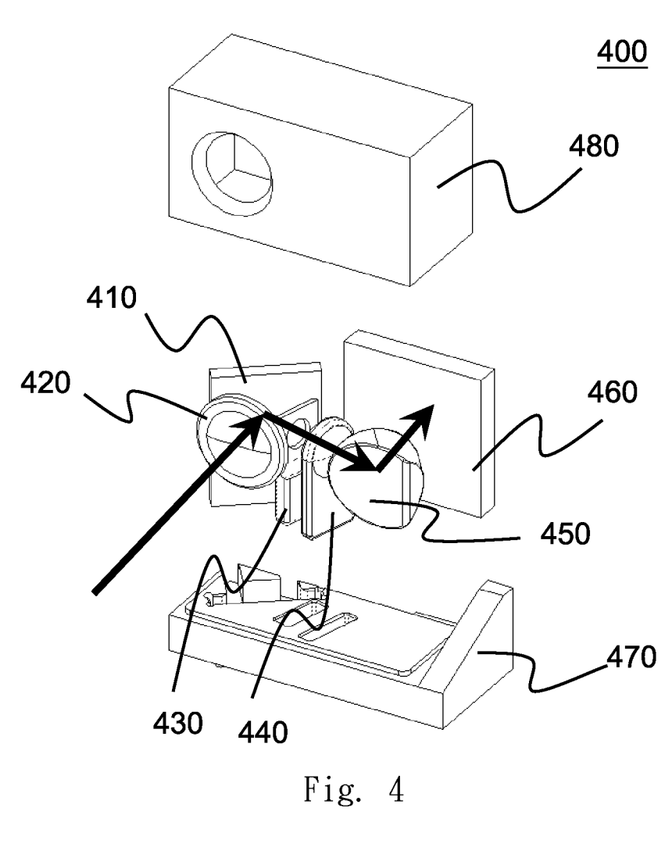
FIG. 4 shows an assembly drawing of an optical system.

Referring to FIG. 4, which shows an assembly drawing of an optical system 400. The optical system 400 comprises an optical module 410, a first lens 420, an aperture stop 430, a second lens 440, a free form mirror 450, an image sensor 460, a base 470, and a cover 480. Although the optical system 400 includes the image sensor 460 in this embodiment, however, in another embodiment, the optical system 400 could not include the image sensor 460, that is, the image sensor 460 could be not customized to the optical system 400.

The optical module 410, such as a polymer MEMS (Micro Electro Mechanical Systems, MEMS) DM (Deformable Mirrors), is used for varying the optical power by deforming reflecting surfaces. The first lens 420 is disposed between the optical module 410 and the free form mirror 450, wherein the first lens 420 is a diverging lens with negative power. The second lens 440 is disposed between the optical module 410 and the free form mirror 450, wherein the second lens 440 is a converging lens with positive power. The function of the first lens 420 and the second lens 440 is to focus objects on to an image plane.

The free form mirror 450 is disposed in opposite side of the optical module 410 such that the light reflected from optical module 410 injects to the free form mirror 450. The free form mirror 450 disposed at the last surface is used to eliminate the residual on-axis aberrations because of large incident angle on lens surfaces. Since the free form mirror 450 is disposed in opposite side of the optical module 410, rather than be disposed in the same side, this folded structure would cause the total thickness of the optical system 400 could be thicker than traditional optical system with the same optical path.

The image sensor 460, such as a ¼" 2M pixels (2.2 μm×2.2 μm per pixel), disposed in the opposite side of the free form mirror 450, is used for receiving the light reflected from the free form mirror 450. The cover 480 is placed on top of the base 470, and the over 480 is also used to block out auxiliary lights.

The solid lenses, such as the first lens 420 and the second lens 440, made of Arton could be manufacturing by forming presses technology, wherein the Arton is suitable for mass fabrication as well as MEMS DM. The free shape lens is manufactured by mechanical milling process. However, this part can be made by mode injection method in the future.

In one embodiment, the optical module 410, second lens 440 and the aperture stop 430 could be plugged into the base. For example, referring to FIG. 5A, which shows an assembly drawing of the optical module 510, the aperture stop 530, the second lens 540 and the base 570, wherein the optical module 510, second lens 540 and the aperture stop 530 are plugged into the base 570. That is, the lenses of present invention are vertically mounted on a flat base. On the contrast, the traditional optical systems have lenses mounted on tubes for sliding. Optical components of present invention are formed in lollipop shape fixtures, such as the second lens 540 shown in FIG. 5A. In addition, the first lens 520 and free form mirror 550 could be mounted on the cover 580 with an opening 581 for image sensor 560. For example, referring to FIG. 5B, which shows the assembly drawing of the first lens 520, free form mirror 550 and the cover 580.

Figure 5A:
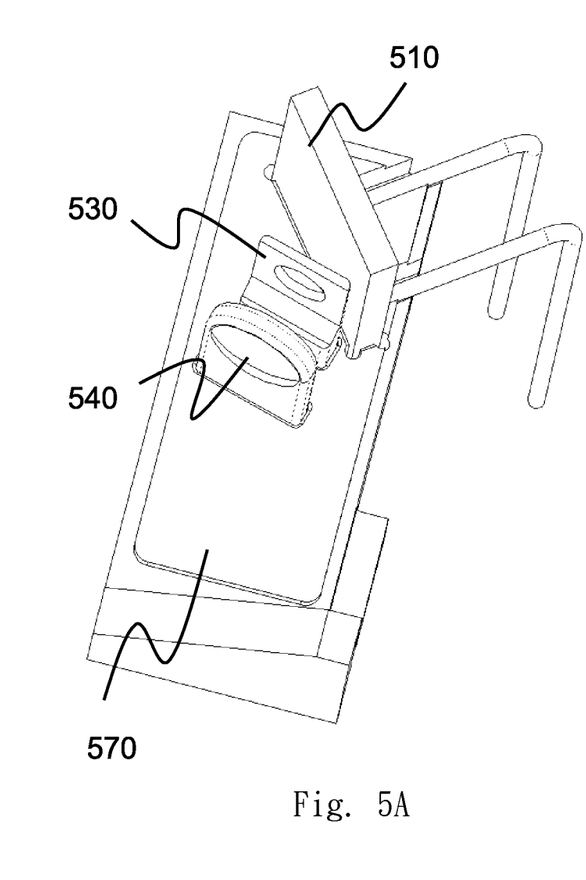
FIG. 5A shows an assembly drawing of the optical module, an aperture stop, the second lens and the base.
Figure 5B:
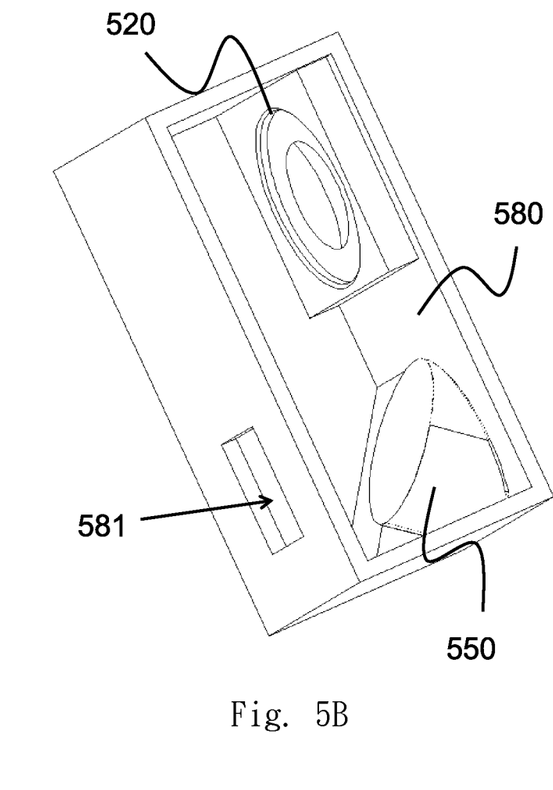
FIG. 5B shows the assembly drawing of the first lens, free form mirror and the cover.

The optical system is completed when the cover 580 is place on top of the base 570. This system could be only 5.4 mm thick in optical lays out and 6.7 mm in thickness after package. The image sensor 560 is not shown in Referring to FIG. 6, which shows the optical system 600 design in reflective form. The light passed from the first lens 620 injects to the optical module 610, and the light reflected from the optical module 610 passes through the aperture stop 630 and the second lens 640 to inject to the free form mirror 650. The light reflected from the free form mirror 650 then injects to the image sensor 660, and then the image sensor 660 could analysis the light to obtain the object information.

Figure 6:
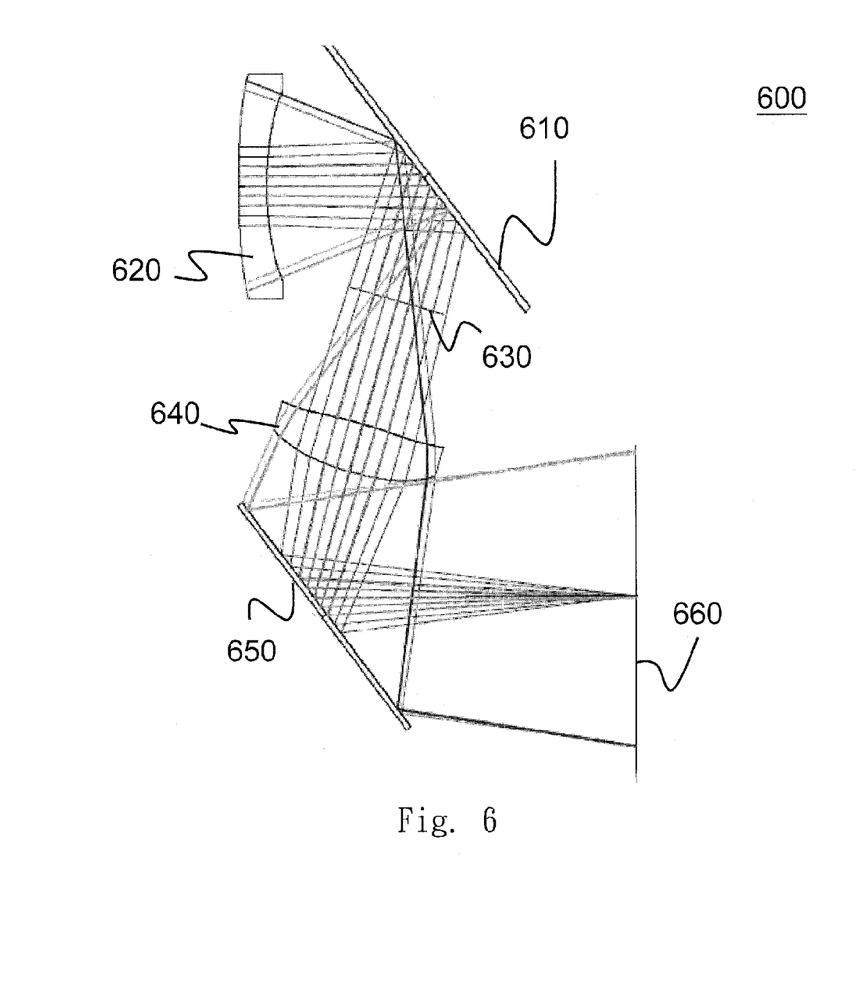
FIG. 6 shows the optical system design in reflective form.

The operation of the optical system 600, for example, when an object is placed closer to the optical system 600, the image position is expected to move away from the original position. To amend the image position change, the focusing power of an optical module 610 must be changed accordingly. When the object position is changed from 500 mm to 44 mm, the focusing power of the optical module 610 must be adjusted from 0 to 20 m$^{-1}$ (i.e. flat to curve) in the optical system 600.

Figure 7:
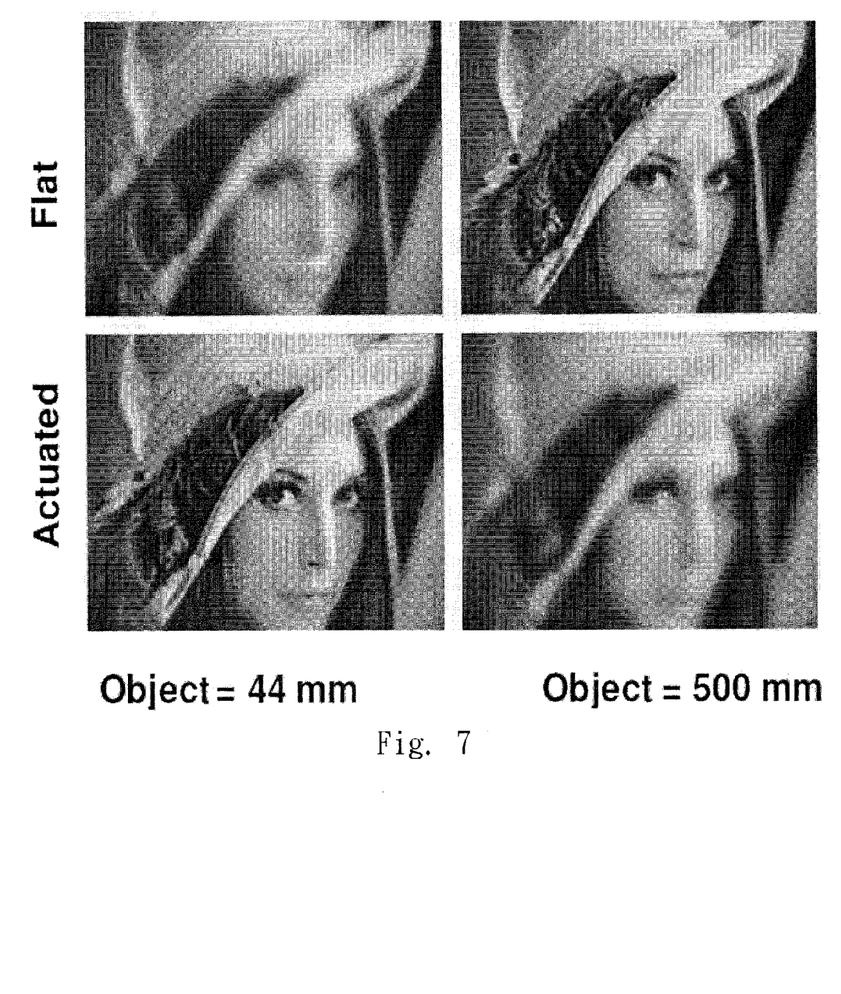
FIG. 7 shows the image analysis simulation calculated by ray tracing method.

The image of lady Lenna was simulated by ZEMAX® to illustrate the description about the change of the optical module 610. FIG. 7 shows the image analysis simulation calculated by ray tracing method. It is clear that it will focus on 500 mm object with a flat MEMS DM. If the object is brought to 44 mm from the first lens 620, the optical module 610 would be needed to actuate to 20 diopter focusing power, which is approximately corresponding to 100 mm radius of curvature.

Figure 8:
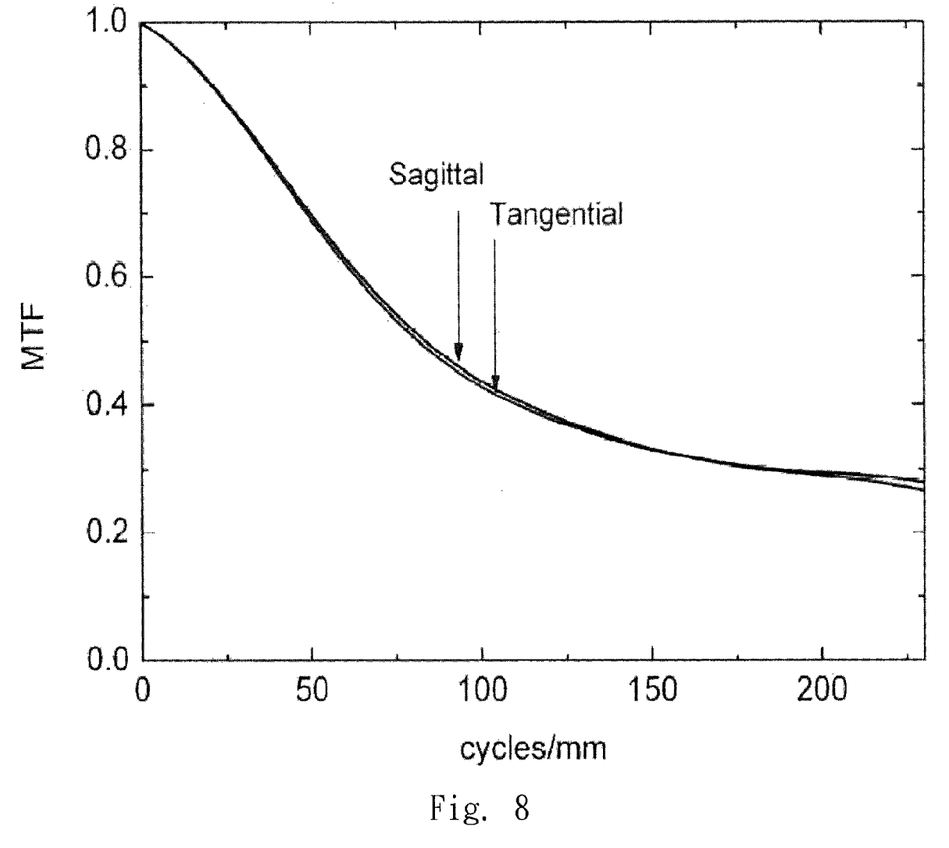
FIG. 8 shows the MTF of the optical system when the optical module is actuated to 20-diopter and the object is placed at 44 mm.

FIG. 8 shows the MTF (Modulation transfer function) of the optical system 600 when the optical module 610 is actuated to 20-diopter and the object is placed at 44 mm. One can see the MTF dropped slightly compared to a flat mirror, but still above 20% at the full frequency. There is a lot of manufacturing specification. For example, the total effective focal length could be about 5.7 mm, f-number could be 4.13, and the incident light could be within ±26 degree. However, the vignetting exists for light at large field angle and the off-axis aberrations degrade the MTF (Modulation Transfer Function). The total thickness could be about 5.4 mm due to folded light beams. In addition, the best performance is on-axis, and the MTF drops to 30 cycles/mm at 26-degree field angle.

Figure 9:
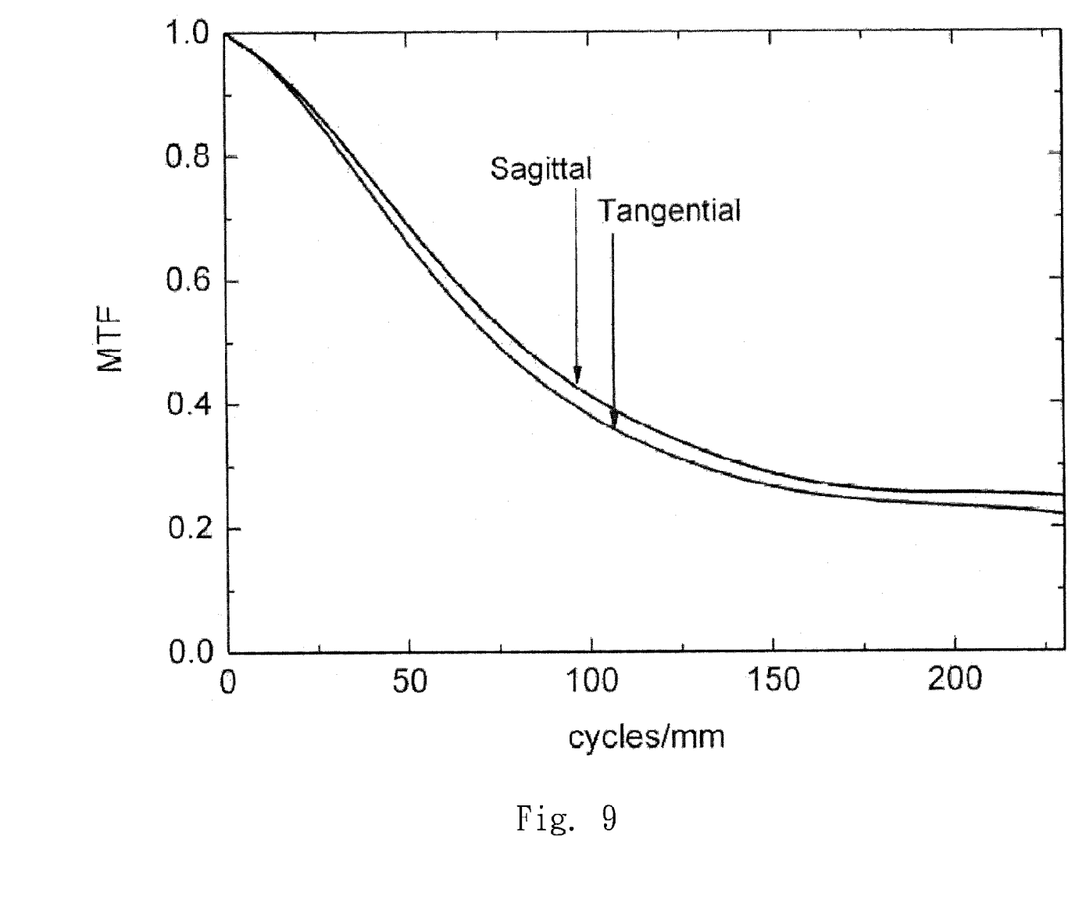
FIG. 9 shows the on-axis MTF of the optical system when the object is placed at 500 mm and the top membrane is flat.

Referring to FIG. 9, which shows the on-axis MTF of the optical system 600 when the object is placed at 500 mm and the top membrane 610 is flat. At this distance, the object is considered far compared with the effective focal length of the optical system 600. The modulation is above 20% at the full frequency of 230 cycles/mm. The full frequency is determined by the size of the imaging pixel, which is 2.2 μm in this case.

One can see the total optical path is about 18 mm, but the thickness can be reduced to about 5 mm by folding its optical path. This means that the longer optical path design could be adopted to release high power lenses requirement. In other words, the solid lenses could be used with lower power that are easier to be fabricated and cause less aberration. This reflective design also gives us flexibility of accommodating larger image sensors without increasing packaging thickness too much.

Unlike traditional optical system, such as traditional camera systems, that lenses are mounted on tubes in sequence, optical components, such as optical module 610 and free form mirror 650, of the optical system 600 are mounted in shapes of lollipop or pillar in order to be mounted on the base 670, as shown in FIG. 6. Since the lights can be folded within the optical system 600, as a result, the long total track length system can be realized in a thinner module.

Figure 10:
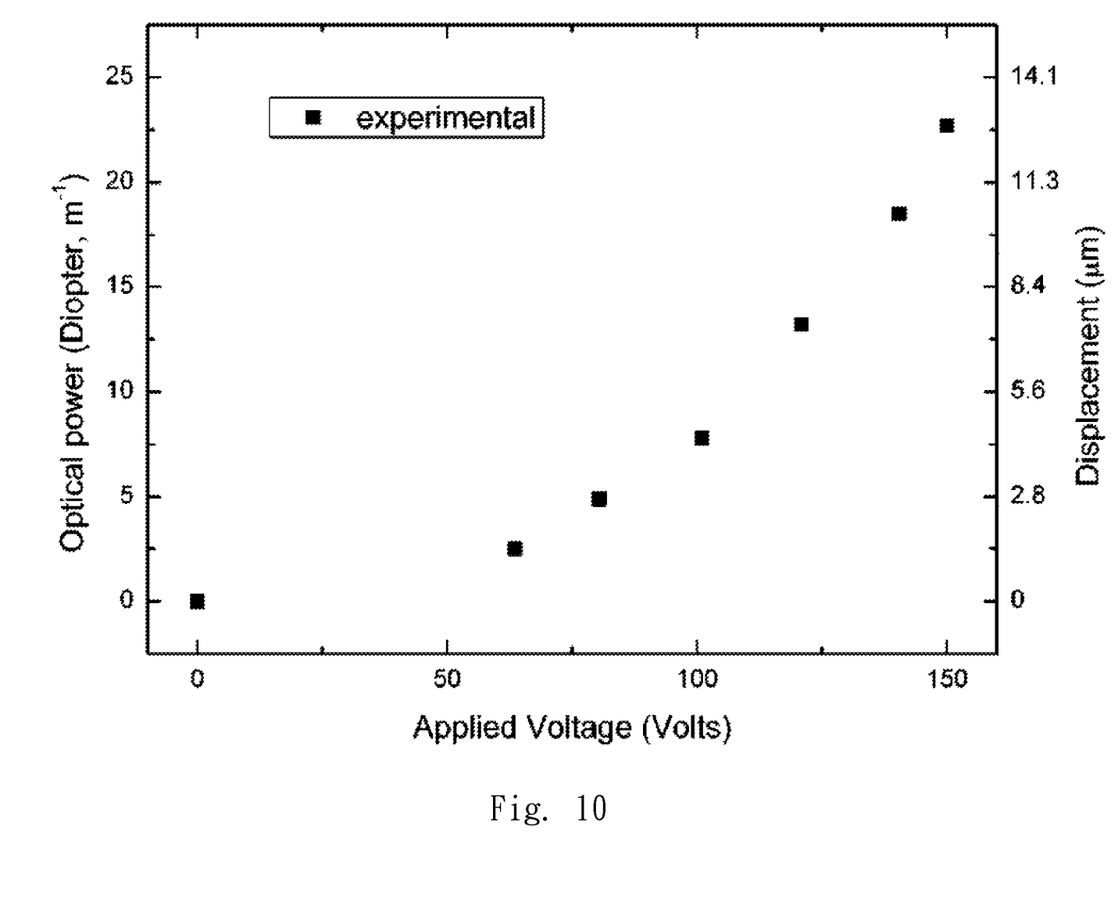
FIG. 10 shows diopter changes versus applied voltage of the top membrane.

The center displacement versus applied voltage of the optical module 610 is measured. A DC-DC voltage amplifier circuit is used to increase the input voltage from 15V to maximum 600V output. Although the applied voltage is high, the power consuming is very low due to capacitor structure with negligible current (~nA statically). The optical power of the optical module 610 is about reciprocal of half of the radius of curvature of the mirror surface. The diopter is calculated according to the first order paraxial rays approximation, the radius of the curvature is calculated by the expression:

$$P = \frac{16x}{D^2}.$$

Where P is the focusing power in unit of diopter ($m^{-1}$), D is diameter of the top membrane, and x is the deformation of the mirror from the center to the edge. The clear aperture is 3 mm in diameter and maximum center displacement is around 12 µm so the diopter is approximately 20 $m^{-1}$ at 150 V applied voltage. The experimental results are shown in FIG. 10.

In present invention, an innovative auto-focusing system featuring a reflective design form and an organic top membrane are provided. As the simulation results shown above, it can perform the optical autofocus function without stepping motors and moving lenses. The over size of the packaged module could be 6.7 mm in thickness, 11.5 mm in length, and 10 mm in height. The power consumption is low because the top membrane is actuated by electrostatic force.

While the disclosure has been described by way of example and in terms of the exemplary embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An optical module, comprising:
a top membrane, comprising:
a supporting layer;
a first metal layer, disposed on lower surface of the supporting layer; and
an isolating layer with an opening, disposed on lower surface of the first metal layer; and
a bottom electrode, disposed below the top membrane, comprising:
a second metal layer; and
a plurality of pillars, disposed on upper surface of the second metal layer and below the isolating layer, wherein some of the pillars support the isolating layer;
wherein the pillars are used for preventing the first metal layer of the top membrane from being pulled down to touch the second metal layer through the opening when a voltage is applied between the first and the second metal layers.

2. The optical module according to claim 1, wherein the top membrane further comprising:
a third metal layer, symmetrically relative to the first metal layer disposed on upper surface of the supporting layer such that a residual stress of the first and the third metal layers are balanced out by a symmetric configuration of the first and the third metal layers.

3. The optical module according to claim 2, wherein the third metal layer is pulled down when the voltage is applied between the first and the second metal layers such that upper surface of the third metal layer has a function of a curved mirror.

4. The optical module according to claim 3, further comprising:
a silicon wafer with a tilt opening, disposed on the upper surface of the third metal layer, and the tilt opening of the silicon wafer is located above the opening of the isolating layer.

5. The optical module according to claim 4, wherein a shape of the tilt opening of the silicon wafer is a rectangle.

6. The optical module according to claim 3, wherein the first, the second and the third metal layers are constitute of aluminum.

7. An optical system having the optical module of claim 3, the optical system further comprising:
a free form mirror, disposed in opposite side of the top membrane such that a light reflected from the third metal layer injects to the free-form mirror.

8. The optical system according to claim 7, further comprising:
a first lens, disposed between the optical module and the free form mirror, wherein the first lens is a diverging lens with negative power;
an aperture stop; and
a second lens, disposed between the optical module and the free-form mirror, wherein the second lens is a converging lens with positive power,
wherein the light passed from the first lens injects to the third metal layer, and the light reflected from the third metal layer passes through the aperture stop and the second lens to inject to the free form mirror.

9. The optical system according to claim 8, further comprising:
a image sensor, disposed in the opposite side of the free form mirror, used for receiving the light reflected from the free form mirror;
wherein the free form mirror is used for eliminating a residual on-axis aberrations.

10. The optical module according to claim 1, wherein the shape of the opening of the isolating layer is rectangle such that a shape of an area of the top membrane pulled down through the opening is elliptical when the voltage is applied.

11. The optical module according to claim 1, wherein the pillars are patterned to form air channels.

12. The optical module according to claim 1, wherein the supporting layer is constitute of polymer or polyimide.

13. A method of manufacturing an optical module, comprising:
forming a top membrane, comprising:
forming a supporting layer;
forming a first metal layer on upper surface of the supporting layer; and
forming an isolating layer with an opening on upper surface of the first metal layer;
forming a bottom electrode, comprising:
forming a second metal layer; and
forming a plurality of pillars on upper surface of the second metal layer; and
bonding the top membrane and the bottom electrode together such that the pillars are disposed between the second metal layer and the isolating layer, and some of the pillars support the isolating layer, wherein the pillars are used for preventing the first metal layer of the top membrane from being pulled down to touch the second metal layer through the opening of the isolating layer when a voltage is applied between the first and the second metal layers.

14. The method of manufacturing an optical module according to claim 13, wherein the step of forming a top membrane further comprising:
   forming a third metal layer, wherein the supporting layer is forming on upper surface of the third metal layer, and the first metal layer is symmetrically relative to the third metal layer disposed on the upper surface of the supporting layer such that a residual stress of the first and the third metal layers are balanced out by a symmetric configuration of the first and the third metal layers, and the third metal layer is pulled down when the voltage is applied between the first and the second metal layers such that the upper surface of the third metal layer has a function of curved mirror.

15. The method of manufacturing an optical module according to claim 14, before the step of forming the third metal layer further comprising:
   forming a silicon wafer with a tilt opening; and
   forming the third metal layer on one side of the silicon wafer;
   wherein the opening of the isolating layer is formed above the tilt opening of the silicon wafer.

16. The method of manufacturing an optical module according to claim 15, wherein a shape of the tilt opening of the silicon wafer is a rectangle.

17. The method of manufacturing an optical module according to claim 14, wherein the first, the second and the third metal layers are constituted of aluminum.

18. The method of manufacturing an optical module according to claim 13, wherein a shape of the opening of the isolating layer is rectangle such that the shape of an area of the top membrane pulled down through the opening is elliptical when the voltage is applied.

19. The method of manufacturing an optical module according to claim 13, wherein the supporting layer is constitute of polymer or polyimide.

20. The method of manufacturing an optical module according to claim 13, wherein the step of forming a bottom electrode further comprising:
   forming a bottom silicon wafer, wherein the second metal layer is formed on upper surface of the bottom silicon wafer.

21. The method of manufacturing an optical module according to claim 13, wherein the pillars are patterned to form air channels.

* * * * *